UNITED STATES PATENT OFFICE.

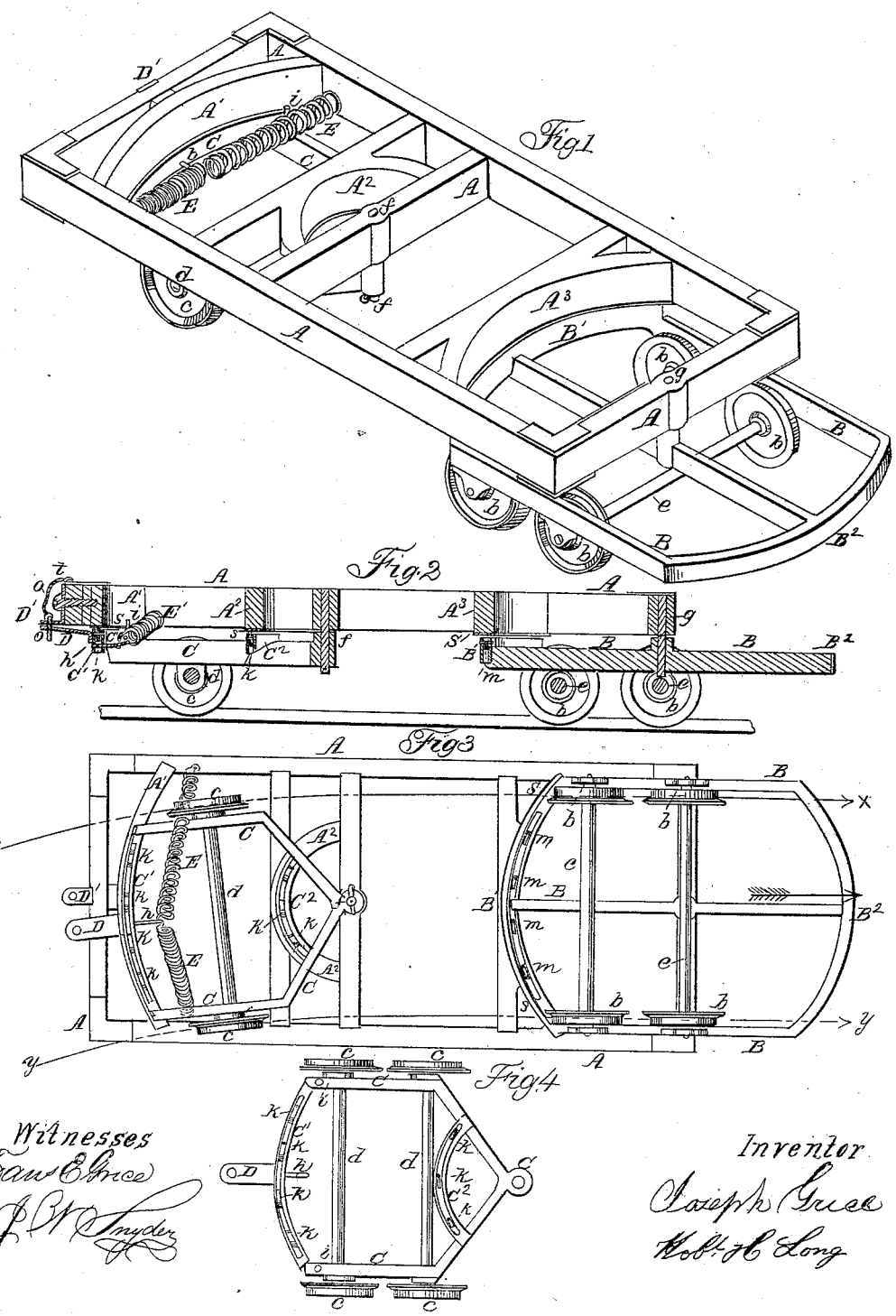

JOSEPH GRICE, OF NEW YORK, N. Y., AND ROBERT H. LONG, OF PHILADELPHIA, PENNSYLVANIA.

RUNNING-GEAR OF CITY RAILROAD-CARS.

Specification of Letters Patent No. 27,217, dated February 21, 1860.

*To all whom it may concern:*

Be it known that we, JOSEPH GRICE, of the city and State of New York, and ROBT. H. LONG, of Philadelphia, county of Philadelphia, in the State of Pennsylvania, have invented certain new and useful Improvements in the Running-Gear of Railroad-Cars; and we do hereby declare that the following is a full and exact description thereof, reference being had to the accompanying drawings and to the letters of reference marked thereon.

Our invention relates to the running gear of rail road cars for city roads and has for its principal object a construction by which the car shall be rendered capable of "curving" more freely the quick turns which necessarily exist in a city road and one which shall be at the same time simple and durable. Practical experiment and experience have demonstrated that one of the greatest difficulties in adapting rail road cars to the streets of cities lies in rendering them capable of freely curving the quick turns, which must exist in a city rail road (especially where the intersecting streets are narrow) and since the attainment of this desired end must necessarily render the road and car truck of much longer endurance, the importance of any improvement which leads to this result, will be readily comprehended. Attempts have been made to render city cars capable of turning freely, by the arrangement of trucks very close together; but this method though enabling the car to turn shorter, is exceedingly objectionable on account of its causing an extended "overhanging weight" at either end. And other methods have been employed involving complexity of mechanism which was practically very objectionable, but in our present invention we have overcome the heretofore existing objection in introducing the railroad car to city roads, while we have not complicated the mechanism.

Our invention consists in so constructing and arranging the trucks of the car that the center around which each vibrates, shall always move in advance of its axle, while the body of the car rests on friction rolls arranged in arcs of circles, the center of which is at the center of the turning pivot and which arcs are so constructed and arranged relatively to the turning point as to relieve the latter of all weight.

To enable those skilled in the art to make and use our invention, we will proceed to describe its construction and operation.

Referring by letters, to the accompanying drawings, forming part of this application, and in which Figure 1 represents a perspective view of a "city-car" running gear embracing our improvements, Fig. 2 represents a vertical longitudinal section through the center of the same, Fig. 3 represents a bottom view of the same, and Fig. 4 represents a top view of a modification of the truck.

Similar letters denote the same parts in the different views.

A is the main frame, to which the car body is secured.

B is the forward and C the rear truck frames.

The forward truck is furnished with two axles $a$, $a$, and the ordinary truck wheels $b$, $b$, $b$, $b$, while the rear truck has one axle $d$, with wheels $c$, $c$.

The main frame A besides its cross beams has curved cross pieces $A'$, $A^2$, $A^3$, the use of which will be presently explained. The truck $c$ is formed with two curved bearing arcs $C'$, $C^2$, each of which is a part of a circle, the center of which is at the center of the pin $f$, on which the truck C, is pivoted, and each of said arcs is slotted out and provided with a number of narrow faced friction rolls $k$, $k$, which run against suitable bearing plates, S, on the under surface of the curved cross beams $A'$, $A^2$, $A^3$, of the main frame A. From about the center of the curved portion $c$, of the rear truck projects outward a coupling strap D, which can be coupled by a pin $a$, (see Fig. 2) to the lip $D'$, on the rear end of frame A. On the inner side of said piece $C'$, and immediately opposite to the projecting strap D, is a projecting pin $h$, to which is fastened the two adjacent ends of the two spiral springs E, E, the distant or outer ends of said springs being fastened to the inner sides of the sides of the frame A (as illustrated).

The forward truck B is hung on a pivot $g$, in like manner onto truck C, but it is only represented as having one bearing arc B, which is concentric to the pivot $g$, and furnished with friction rolls $m$, similar to those on truck C, which run against the under side of the curved cross piece A³ (on bearing plate S). The forward truck B is represented as extending out some distance beyond the end of car frame A, as at B². This extension of the forward truck is for the purpose of carrying the engine or other motive power for propelling the car, and its peculiarities will form the subject of another application when it will be fully described. The truck C illustrated at Fig. 4, it will be seen is similar to the one correspondingly lettered attached to the frame A, except that it has two axles and sets of wheels instead of one. The rear truck C it will be observed is pivoted by a pin $f$ which is located some distance in advance of its (the truck's) axle $d$, so that when the said truck is swiveled or vibrated on its said pivot $f$, its axle $d$ does not only have its relative angle with the frame A changed but is also shifted laterally, so that its relative position to the forward truck is changed in such a manner as to enable the car to turn shorter than if the said truck C, swiveled on a point over the axle, and it will also be seen that when the four wheel truck seen at Fig. 4 is employed (in lieu of the one represented as being attached to the frame A) its axles $d$, $d$, are both moved laterally when the truck turns on its pivot $f$, one of said axles being moved more and the other less than the one axle of the single truck. The arcs C' and C² of the rear truck are so arranged as to come outside of the axle or axles, so as to afford bearings under all circumstances on each side of the axles whereby no weight is brought on the portion of the truck where the pivot $f$ is located, and it will be seen that by this method of construction, relieving that part of the truck, where the pivot is of all weight, no connection with the employment of the friction wheels $k$, in the bearing arcs, the truck is enabled under the weight of the car to vibrate very easily and freely. In the apparatus which we have used, the frame A does not come down onto the truck at that point where the pivot is located, but rests solely on the bearing arcs' friction rolls.

Although the forward truck is represented with two pairs of wheels, it may only have one pair; and when it is desired to draw the car by animal power, a truck precisely similar to the rear truck should be employed in lieu of the truck B, the truck B being intended more particularly for the application of steam or other engine power, as will be explained in our other application. The tendency of the springs E E is to constantly induce the truck to assume a central position—that is, to make its axle or axles lay at right angles to the sides of the frame A, the principal object of this centralizing principle being to pull the truck wheels against the rail (in curving and running into a straight line) of the least curvature on the outer rail of the curve, to prevent the switching over suddenly of the truck by the motion of the car. This operation of the springs E, together with the truck C, will be readily comprehended by reference to Fig. 3 (bottom view) where the lines of the rails on which the car is supposed to be moving in the direction indicated by the red arrow.

The operation of the vibrating trucks is only advantageous, (indeed safe) when the axles follow behind the point around which the truck vibrates, and as the reverse of this is the case when the car is backed, the truck C, in backing should be locked to the frame by means of the coupling pin $a$, passing through the straps D and D, as represented at Fig. 2. But as the car will have only to change the direction of motion at each end of the route, we propose to turn the car at the end of the route, the securing pin being only used when the car may have to back a short distance for some unforeseen cause.

We are aware that carriage bodies have been hung on truck or axle frames pivoted to the body at opposite ends of said axle frames, and we are also aware of the trucks of locomotives having been pivoted to the bed of the locomotive at a point in the rear of the axles in the line of motion, but neither of such methods of pivoting truck frames would answer for the trucks of city cars, nor accomplish at all the ends for which our invention is intended.

In our improved construction of city cars the trucks are pivoted at a point in advance (in the line of motion intended for the car) of their axles so that the truck wheels will follow in the wake of the pivot and adjust themselves to the line of motion, or be guided, instead of being pushed ahead unguided as in the locomotive trucks, to which we have just alluded.

We do not wish to confine ourselves to the number of wheels in each truck, so long as the principal features of construction and operation hereinbefore described as forming parts of our invention are retained, nor do we wish to be understood as laying any claim to the employment of trucks which vibrate on pivots not over their axles, but—

Having described the construction and operation of our improved construction of running gear for city cars, as we have practiced it, what we claim therein as new and desire to secure by Letters Patent is—

The vibrating truck C pivoted in advance of its axles, in the line of motion of the car, in combination with the arcs C' and C² and friction rolls K, with suitable bearing surfaces in the bottom of the car body; the whole constructed and operating substantially as specified for the purpose set forth—and we also claim in combination with a vibrating truck pivoted at a point not over the axles the employment of sustaining arcs,
5 so arranged on each side of the axles as to support the car and relieve the turning point of all weight, as specified.

In testimony whereof, we have hereunto set our hands, and affixed our seals this eighteenth day of January A. D. 1860.

JOSEPH GRICE.
          ROBT. H. LONG.

Witnesses:
  LEWIS VERON,
  FRANS. E. GRICE.